US006839561B2

(12) United States Patent
Kato (10) Patent No.: US 6,839,561 B2
(45) Date of Patent: Jan. 4, 2005

(54) GPRS AND METHOD FOR CONTROLLING SAME

(75) Inventor: Akiko Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 465 days.

(21) Appl. No.: 10/062,489

(22) Filed: Feb. 5, 2002

(65) Prior Publication Data

US 2002/0151316 A1 Oct. 17, 2002

(30) Foreign Application Priority Data

Feb. 5, 2001 (JP) ........................................ 2001-027762

(51) Int. Cl.⁷ ................................................ H04Q 7/20
(52) U.S. Cl. .................... 455/461; 455/462; 455/414.1; 455/466; 370/328; 370/352
(58) Field of Search ................. 455/466, 461, 455/462, 403, 414.1, 419; 370/352, 328, 329, 401, 410, 438, 463, 394, 351, 353–360

(56) References Cited

U.S. PATENT DOCUMENTS

| 6,061,346 | A | * | 5/2000 | Nordman ..................... 370/352 |
| 6,466,552 | B1 | * | 10/2002 | Haumont ..................... 370/310 |
| 6,515,989 | B1 | * | 2/2003 | Ronneke ..................... 370/389 |
| 6,549,776 | B1 | * | 4/2003 | Joong ........................ 455/433 |
| 6,578,082 | B1 | * | 6/2003 | Ho et al. .................... 709/233 |
| 6,636,502 | B1 | * | 10/2003 | Lager et al. ................ 370/352 |
| 6,662,005 | B1 | * | 12/2003 | Palvianen ................ 455/414.1 |
| 6,687,252 | B1 | * | 2/2004 | Bertrand et al. ............ 370/401 |
| 6,707,813 | B1 | * | 3/2004 | Hasan et al. ................ 370/356 |
| 6,760,325 | B1 | * | 7/2004 | Hameleers et al. ......... 370/352 |

FOREIGN PATENT DOCUMENTS

JP          A 11-88433          3/1999

* cited by examiner

*Primary Examiner*—Cong Van Tran
(74) *Attorney, Agent, or Firm*—Young & Thompson (57) ABSTRACT

When a transmitting mobile radio terminal requires the first subscriber switchboard station to start a packet data communication directed to a receiving mobile radio terminal, the first subscriber switchboard station inquires of a number-management server about a mobile radio terminal-discriminator corresponding to a receiving user's address. When searching out the appropriate mobile radio terminal-discriminator, the number-management server transmits it to the first subscriber switchboard station. When receiving the appropriate mobile terminal-discriminator, the first subscriber switchboard station inquires of the HLR about the second subscriber switchboard station in a location area of which the receiving mobile radio terminal exists. The HLR searches out the second subscriber switchboard station, and transmits information thereon to the first subscriber switchboard station, which establishes a route for the packet data communication between the transmitting and receiving mobile radio terminals.

11 Claims, 8 Drawing Sheets

GPRS AND METHOD FOR CONTROLLING SAME

FIELD OF THE INVENTION

The invention relates to a general packet radio service system (GPRS, hereinafter) and a method for controlling the same, and especially to a GPRS in which a packet data can be transmitted and received between mobile radio terminals without passing through an external work and a method for controlling the same.

BACKGROUND OF THE INVENTION

Figure 1:
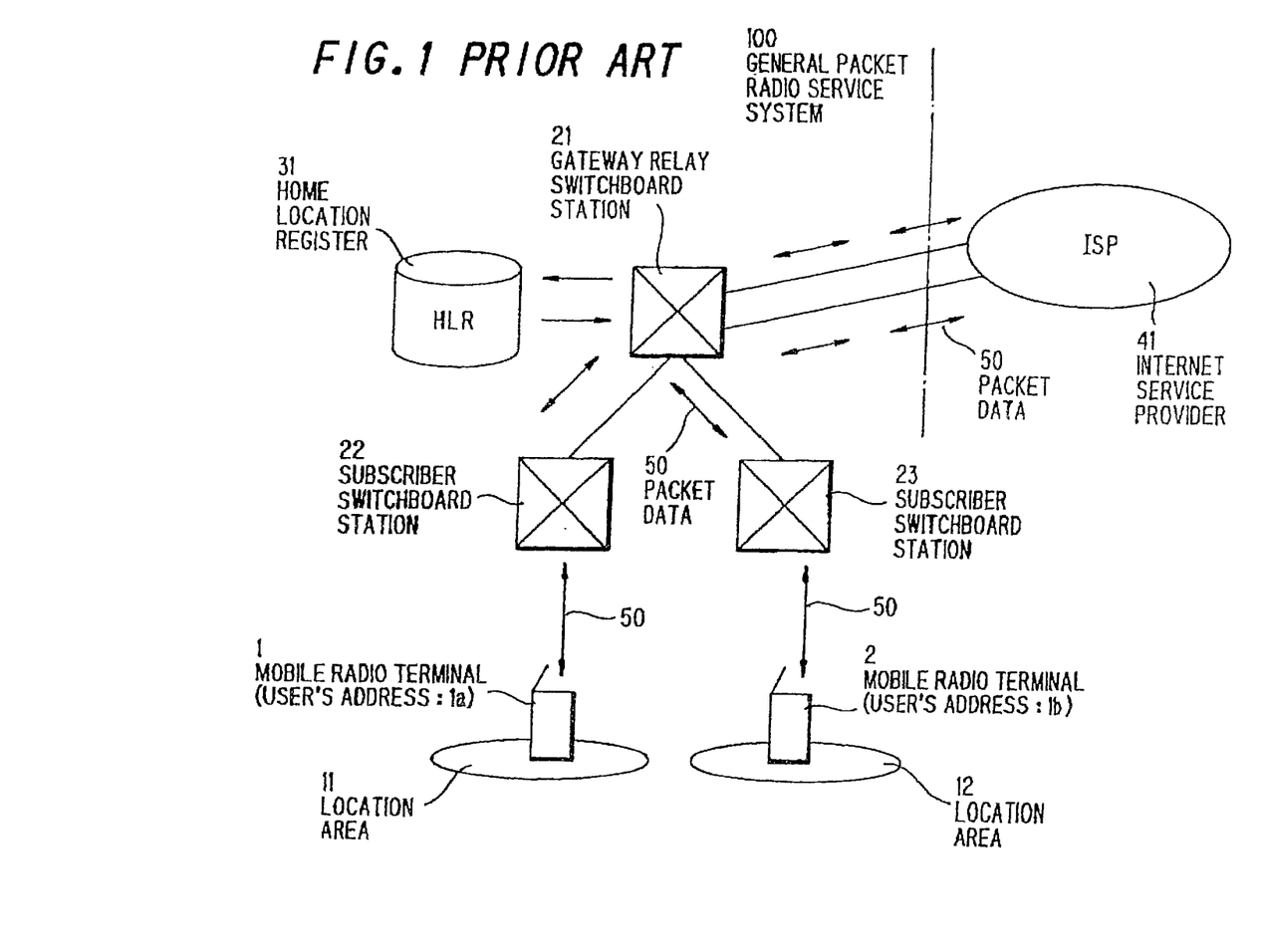
FIG. 1 is a block diagram for showing a typical example of a conventional GPRS.

FIG. 1 is a block diagram for showing a typical example of a conventional GPRS.

Mobile radio terminals 1, 2, such as cellular telephones, respectively exist in location areas of subscriber switchboard stations 1, 2. The mobile radio terminal 1 is connected with a subscriber switchboard station 22 by radio. The mobile radio terminal 2 is connected with a subscriber switchboard station 23 by radio. The subscriber switchboard stations 22, 23 are connected with a gateway relay switchboard station 21. The gateway relay switchboard station 21 is connected with a home location register (HLR, hereinafter) 31 for managing informations on subscribers, and with an internet service provider (ISP, hereinafter) 41. The ISP 41 is connected with the HLR 31 via the gateway relay switchboard station 21. The gateway relay switchboard station 21, the subscriber switchboard stations 22, 23, and the HLR 31 form the GPRS 100.

In the GPRS shown in FIG. 1, when the mobile radio terminal 1 desires to transmit a packet data 50 to the mobile radio terminal 2, the mobile radio terminal 1 requires the gateway relay switchboard station 21 to approve transmission of the packet data 50 via the subscriber switchboard station 22. The gateway relay switchboard station 21 transmits the packet data 50 to the ISP 41. In the above description, the destination of the packet data 50 is not necessarily restricted to the ISP 41, and may be the other network or the other packet network.

When the packet data 50 directed to the mobile radio terminal 2 is delivered to the gateway relay switchboard station 21 via the ISP 41, the gateway relay switchboard station 21 inquires of the HLR 31 about a subscriber switchboard station in a location area of which the mobile radio terminal 2 exists. If it becomes clear that the mobile radio terminal 2 exists in the location area of the subscriber switchboard station 23, the gateway relay switchboard station 21 notifies the subscriber switchboard station 23 of arrival of the message. The gateway relay switchboard station 21 carries out paging for calling the mobile radio terminal 2 up via the subscriber switchboard station 23, establishes a route for transmitting the packet data 50 to the mobile radio terminal 2, and executes transmission of the packet data 50 directed to the mobile radio terminal 2. Thereafter, transmission and reception of the packet data 50 between the mobile radio terminals 1, 2 are also performed via the ISP 41.

Figure 2:
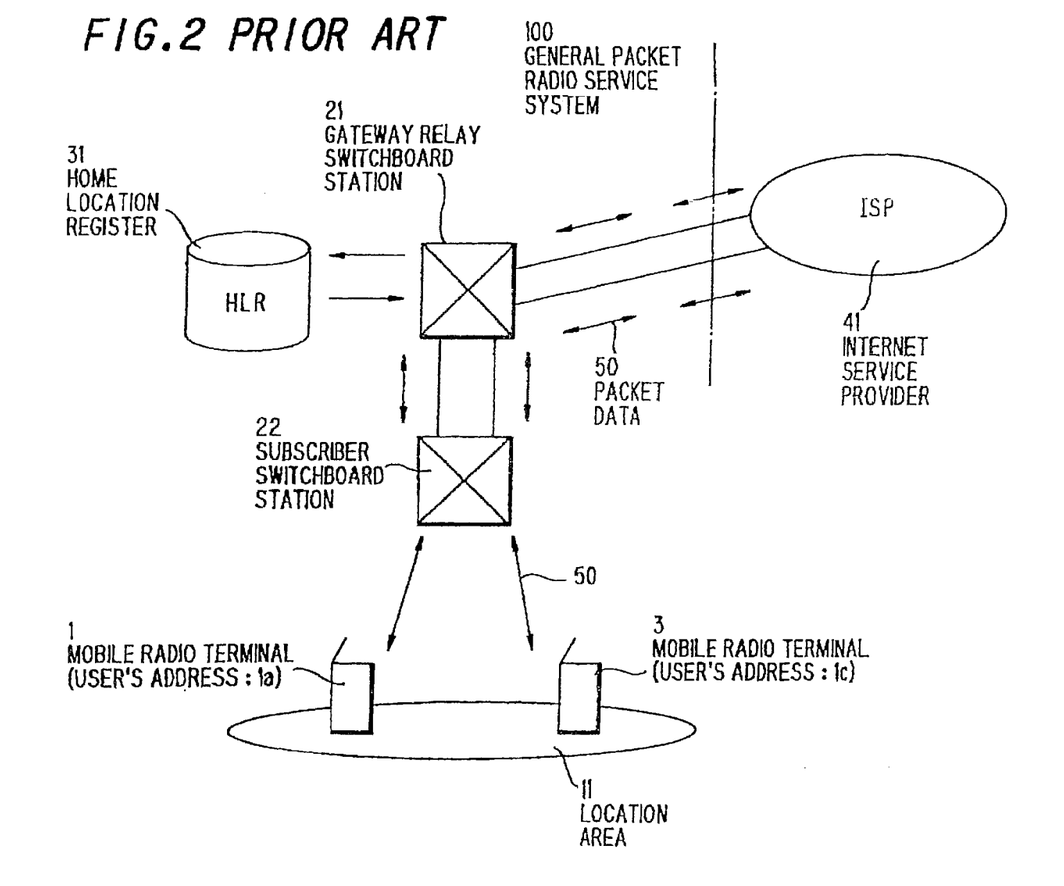
FIG. 2 is a block diagram for showing the other example of a conventional GPRS.

FIG. 2 shows the other example of the conventional GPRS.

In the GPRS shown in FIG. 2, the mobile radio terminals 1, 3 exist in the same location area 11 of the subscriber switchboard station 22. In the system shown in FIG. 2, when the mobile radio terminal 1 desires to transmit the packet data 50 to the mobile radio terminal 3, the packet data 50 is transmitted to the ISP 41 in the first place, after the mobile radio terminal 1 requires the gateway relay switchboard station 21 to start transmission of the packet data 50 directed to the mobile radio terminal 3 via the subscriber switchboard station 22. When the packet data 50 directed to the mobile radio terminal 3 is delivered to the gateway relay switchboard station 21 via the ISP 41, the gateway relay switchboard station 21 inquires of the HLR 31 about a subscriber switchboard station in a location area of which the mobile radio terminal 3 exists. If it becomes clear that the mobile radio terminal 3 exists in the location area of the subscriber switchboard station 22, the gateway relay switchboard station 22 notifies the subscriber switchboard station 22 of arrival of the packet data 50. The gateway relay switchboard station 21 carries out paging for calling the mobile radio terminal 3 up via the subscriber switchboard station 22, and establishes the route for transmitting the packet data 50 to the mobile radio terminal 3. Thereafter, transmission and reception of the packet data 50 between the mobile radio terminals 1, 3 are always performed through the ISP 41.

The GPRS disclosed in Japanese Patent Applications, Laid-Open, No. 10-13904 has a structure similar to that shown in FIG. 1, in which the plural mobile radio terminals are placed under the command of the same gateway relay switchboard station. In the former system, the gateway relay switchboard station assigns packet addresses to the respective mobile radio terminals dynamically, and the packet addresses of the limited number are utilized efficiently.

However, according to the GPRS shown in FIGS. 1, 2, since the standard of the communication system is so constructed that the packet data can not be directly transmitted and received between the mobile radio terminals even when they are placed under the command of the same GPRS, the data packet is necessarily transmitted and received therebetween via the external network, such as the ISP. As a result, the packet data must trace a roundabout route even in the same GPRS, and it sometimes occurs that the packet data is lost or delayed. This problem cannot be solved by the GPRS proposed in Japanese Patent Applications, Laid-Open, No. 10-13904.

SUMMARY OF THE INVENTION

Accordingly, it is an object of the invention to provide a GPRS in which a packet data can be transmitted and receive between transmitting and receiving mobile radio terminals without passing through an external network, and a method for controlling the same.

According to the first feature of the invention, a GPRS, in which one or more subscriber switchboard stations are founded, plural mobile radio terminals are connected with the one or more subscriber switchboard stations by radio, and a packet data is transmitted and received between the transmitting and receiving mobile radio terminals via the one or more subscriber switchboard stations, comprises:

a number-management server, which is connected with the one or more subscriber switchboard stations, manages a correspondence between user's addresses respectively assigned to the plural mobile radio terminals and mobile radio terminals-discriminators respectively corresponding to the user's addresses, reads out the mobile radio terminal-discriminator corresponding to the receiving user's address in accordance a requirement presented from the first subscriber switchboard station in a location area of which the transmitting mobile radio terminal exists, wherein the transmitting mobile radio terminal has required the first subscriber switchboard station to start a packet data communication directed to the receiving mobile radio terminal, and notified the first subscriber switchboard station of the receiving user's address, and transmits the mobile radio terminal-discriminator corresponding to the receiving user's address to the first subscriber switchboard station, and a HLR which is connected with the one or more subscriber switchboard stations, reads out the second subscriber switchboard station in a location area of which the receiving radio terminal exists on a basis of the mobile radio terminal-discriminator corresponding to the receiving user's address transmitted from the first subscriber switchboard station, transmits information on the second subscriber switchboard station to the first subscriber switchboard station, and thereby enables the first subscriber switchboard station to start a packet data communication directed to the receiving mobile radio terminal via the second subscriber switchboard station.

According to the aforementioned system, when the transmitting mobile radio terminal requires the first subscriber switchboard station in the location area of which the transmitting mobile radio terminal exists to start the packet data communication directed to the receiving mobile radio terminal, the first subscriber switchboard station inquires of the number-management server about the mobile radio terminal discriminator corresponding to the receiving user's address. The number-management servers searches for the mobile radio terminal-discriminator corresponding to the receiving user's address, and transmits it to the first subscriber switchboard station. The first subscriber switchboard station inquires of the HLR about the second subscriber switchboard station in the location area of which the receiving mobile terminal exists. The HLR searches out the second subscriber switchboard station on the basis of the mobile radio terminal-discriminator corresponding to the receiving user's address, and transmits information thereon to the first subscriber switchboard. The first subscriber switchboard station requires the second subscriber switchboard station to start the packet data communication directed to the receiving mobile radio terminal. Accordingly, it becomes possible to interchange the packet data between the transmitting and receiving mobile radio terminals which are placed under the command of the same GPRS without passing through the external network, so that the packet data can be prevented from being lost and delayed.

According to the second feature of the invention, a GPRS, in which one or more subscriber switchboard stations are founded, plural mobile radio terminals are connected with the one or more subscriber switchboard stations by radio, and a packet data is transmitted and received between the transmitting and receiving mobile radio terminals via the one or more subscriber switchboard stations, comprises:

a HLR, which is provided which a table for clarifying a correspondence between user's addresses respectively assigned to the plural mobile radio terminals and mobile radio terminal-discriminators respectively corresponding to the user's addresses, connected with the one or more subscriber switchboard stations, reads out the mobile radio terminal-discriminator corresponding to the receiving user's address from the table, the receiving user's address being transmitted to the HLR from the first subscriber switchboard station in a location area of which the transmitting mobile radio terminal exists just after the transmitting mobile radio terminal requires the first subscriber switchboard station to start the packet data communication directed to the receiving mobile radio terminal, judges the second subscriber switchboard station in a location area of which the receiving mobile radio terminal exists on a basis of the mobile radio terminal-discriminator corresponding to the receiving user's address, transmits information on the second subscriber switchboard station to the first subscriber switchboard station, and thereby enables the first subscriber switch board station to start a packet data communication directed to the receiving mobile radio terminal via the second subscriber switchboard station.

According to the aforementioned system, when the transmitting mobile radio terminal requires the first subscriber switchboard station in the location area of which the transmitting mobile radio terminal exists to start the packet data communication directed to the receiving mobile radio terminal, the first subscriber switchboard station inquires of the HLR about the second subscriber switchboard station in the location area of which the receiving mobile radio terminal exists. First, the HLR searches out the mobile radio terminal-discriminator corresponding to the receiving user's address from the built-in table, referring to the receiving user's address which is transmitted from the first subscriber switchboard station. Next, the HLR judges the second subscriber switchboard station on the basis of the mobile radio terminal-discriminator corresponding to the receiving user's address, and transmits information on the second subscriber switchboard station to the first subscriber switchboard station. The first subscriber switchboard station requires the second subscriber switchboard station to start the packet data communication directed the receiving mobile radio terminal. Accordingly, it becomes possible to interchange the packet data between the transmitting and receiving terminals which are placed under the command of the same GPRS without passing through the external network.

According to the third feature of the invention, a method for controlling a GPRS, in which one or more subscriber switchboard stations are founded, plural mobile radio terminals are connected with the one or more subscriber switchboard stations by radio, and a packet data is transmitted and received between the transmitting and receiving mobile radio terminals via the one or more subscriber switchboard stations, comprises:

managing a correspondence between user's addresses respectively assigned to the plural mobile radio terminals and mobile radio terminal-discriminators respectively assigned to the user's addresses in the first table provided for a number-management server, clarifying a correspondence between the mobile radio terminal-discriminators and the subscriber switchboard stations in location areas of which the mobile radio terminals corresponding to the mobile radio terminal-discriminators respectively exist in the second table provided for a HLR, transmitting a requirement presented from the transmitting mobile radio terminal that the first subscriber switchboard station in a location area of which the transmitting mobile radio terminal exists should start a packet data communication directed to the receiving mobile radio terminal to the first subscriber switchboard station, the requirement presented from the transmitting mobile radio terminal including the transmitting and receiving user's addresses, transmitting a requirement presented from the first subscriber switchboard station that the number-management server should read out the mobile radio terminal-discriminator corresponding to the receiving user's address to the number-management server, the requirement presented from the first subscriber switchboard station including the receiving user's address, reading out the mobile radio terminal-discriminator corresponding to the receiving user's address from the first table provided for the number-management server, transmitting the mobile radio terminal-discriminator corresponding to the receiving user's address to the first subscriber switchboard station from the number-management server, transmitting a requirement presented from the first subscriber switchboard station that the HLR should read out the second subscriber switchboard station in a location area of which the receiving mobile radio terminal exists, the requirement presented from the first subscriber switchboard station including the mobile radio terminal-discriminator corresponding to the receiving user's address, reading out the second subscriber switchboard station from the second table provided for the HLR, referring to the mobile radio terminal-discriminator corresponding to the receiving user's address which is transmitted from the first subscriber switchboard station, transmitting information on the second subscriber switchboard station to the first subscriber switchboard station from the HLR, transmitting a requirement presented from the first subscriber switchboard station that the second subscriber switchboard station should start the packet data communication directed to the receiving mobile radio terminal, the requirement presented from first subscriber switchboard station including the mobile radio terminal discriminator corresponding to the receiving user's address and the transmitting and receiving user's addresses, and establishing a route for the packet data communication between the transmitting and receiving mobile radio terminals.

According to the fourth feature of the invention, a method for controlling a GPRS, in which one or more subscriber switchboard stations are founded, plural mobile radio terminals are connected with the one or more subscriber switchboard stations by radio, and a packet data is transmitted and received between the transmitting and receiving mobile radio terminals via the one or more subscriber switchboard stations, comprises:

managing a correspondence between user's addresses respectively assigned to the plural mobile radio terminals and mobile radio terminal-discriminators respectively assigned to the user's addresses in the first table provided for a HLR, clarifying a correspondence between the mobile radio terminal-discriminators and the subscriber switchboard stations in location areas of which the mobile radio terminals corresponding to the mobile radio terminal-discriminators respectively exist in the second table provided for a HLR, transmitting a requirement presented from the transmitting mobile radio terminal that the first subscriber switchboard station in a location area of which the transmitting mobile radio terminal exists should start a packet data communication directed to the receiving mobile radio terminal to the first subscriber switchboard station, the requirement presented from the transmitting mobile radio terminal including the transmitting and receiving user's addresses, transmitting a requirement present from the first subscriber switchboard station that the HLR should read out the mobile radio terminal-discriminator corresponding to the receiving user's address to the HLR, the requirement presented from the first subscriber switchboard station including the receiving user's address, reading out the mobile radio terminal-discriminator corresponding to the receiving user's address from the first table provided for the HLR, reading out the second subscriber switchboard station in a location area of which the receiving mobile radio terminal exists from the second table provided for the HLR, referring to the mobile radio terminal-discriminator corresponding to the receiving user's address which is clarified in the above step, transmitting information on the second subscriber switchboard station to the first subscriber switchboard station from the HLR, transmitting a requirement present from the first subscriber switchboard station that the second subscriber switchboard station should start the packet data communication directed to the receiving mobile radio terminal, the requirement resented from the first subscriber switchboard station including the mobile radio terminal-discriminator corresponding to the receiving user's address and the transmitting and receiving user's addresses, and establishing a route for the packet data communication between the transmitting and receiving mobile radio terminals.

BRIEF DESCRIPTION OF DRAWINGS

The invention will be explained in more detail in conjunction with appended drawings, wherein.

DESCRIPTION OF PREFERRED EMBODIMENTS

Hereafter, embodiments of the invention will be explained referring to the appended drawings.

[The First Preferred Embodiment]

Figure 3:
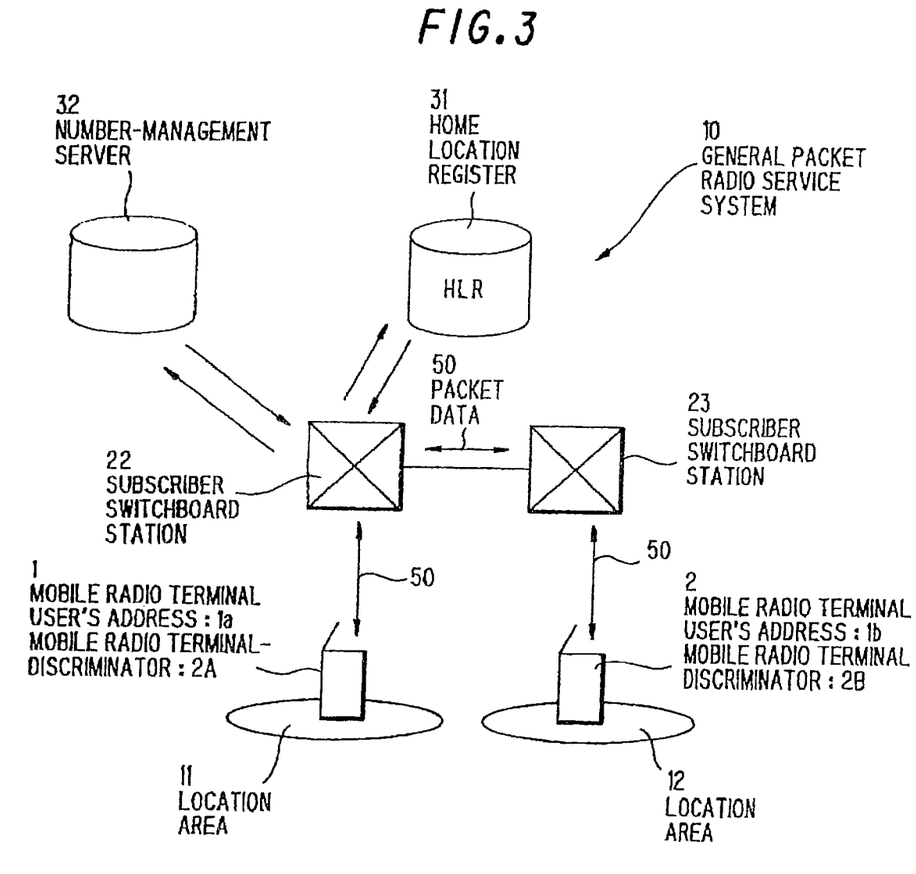
FIG. 3 is a block diagram for showing a GPRS according to the first preferred embodiment of the invention.

FIG. 3 shows a GPRS according to the first preferred embodiment of the invention.

Mobile radio terminals 1, 2 are cellular telephones, personal handyphone systems (PHS), etc., where the mobile radio terminal 1 exists in a location area 11 of a subscriber switchboard station 22, and the mobile radio terminal 2 exists in a location area 12 of a subscriber switchboard station 23. The mobile radio terminal 1 is connected with the subscriber switchboard station 22 by radio, and the mobile radio terminal 2 is connected with the subscriber switchboard station 23 by radio. The subscriber switchboard station 23 is connected with the subscriber switchboard station 22, which is connected with a HLR (home location register) 31 and a number-management server 32. Thereupon, a GPRS 10 is composed of the subscriber switchboard stations 22, 23, the HLR 31 and the number-management server 32. A gateway relay switchboard station (not shown) is connected with the respective subscriber switchboard stations similarly to the system shown in FIG. 1.

The number-management server 32 is provided with TABLE A for clarifying a correspondence between user's addresses and mobile radio terminal-discriminators, and set up by a telephone company which operates the GPRS 10. The user's address 1a and the mobile radio terminal-discriminator 2A are assigned to the mobile radio terminal 1. Similarly, the user's address 1b and the mobile radio terminal-discriminator 2B are assigned to the mobile radio terminal 2. The mobile radio terminal-discriminator is either a number for exclusive use or a telephone number, such as "090-xxxx-0123", which is granted at the time of contract, and determine by the manager of the network at his option.

TABLE A is shown as follows.

TABLE A

| User's address | Mobile radio terminal-discriminator |
|---|---|
| 1a | 2A |
| 1b | 2B |
| 1c | 2C |
| . | . |
| . | . |
| . | . |

As mentioned in the above, TABLE A clarifies the correspondence between the user's addresses (1a, 1b, . . . ) and the mobile radio terminal-discriminators (2A, 2B, . . . ), and the mobile radio terminal-discriminator can be uniquely searched for based on the user's address.

The HLR 31 holds TABLE B mentioned layer as well as various informations on the subscribers, such as the contents of the contracts. TABLE B is shown as follows.

TABLE B

| Mobile radio terminal-discriminator | Subscriber switchboard station | Other information on subscriber |
|---|---|---|
| 2A | 22 | . . . |
| 2B | 23 | . . . |
| 2C | 22 | . . . |
| . | . | . |
| . | . | . |
| . | . | . |

For example, TABLE B shows that the mobile radio terminal which corresponds to the mobile radio terminal-discriminator 2B exists in the location area of the subscriber switchboard station 23. That is to say, the subscriber switchboard station in the location area of which the mobile radio terminal corresponding to the specified mobile radio terminal-discriminator can be uniquely determined from TABLE B. The column corresponding to the subscriber switchboard stations in TABLE B is renewed depending on the movements of the mobile radio terminals.

Figure 4:
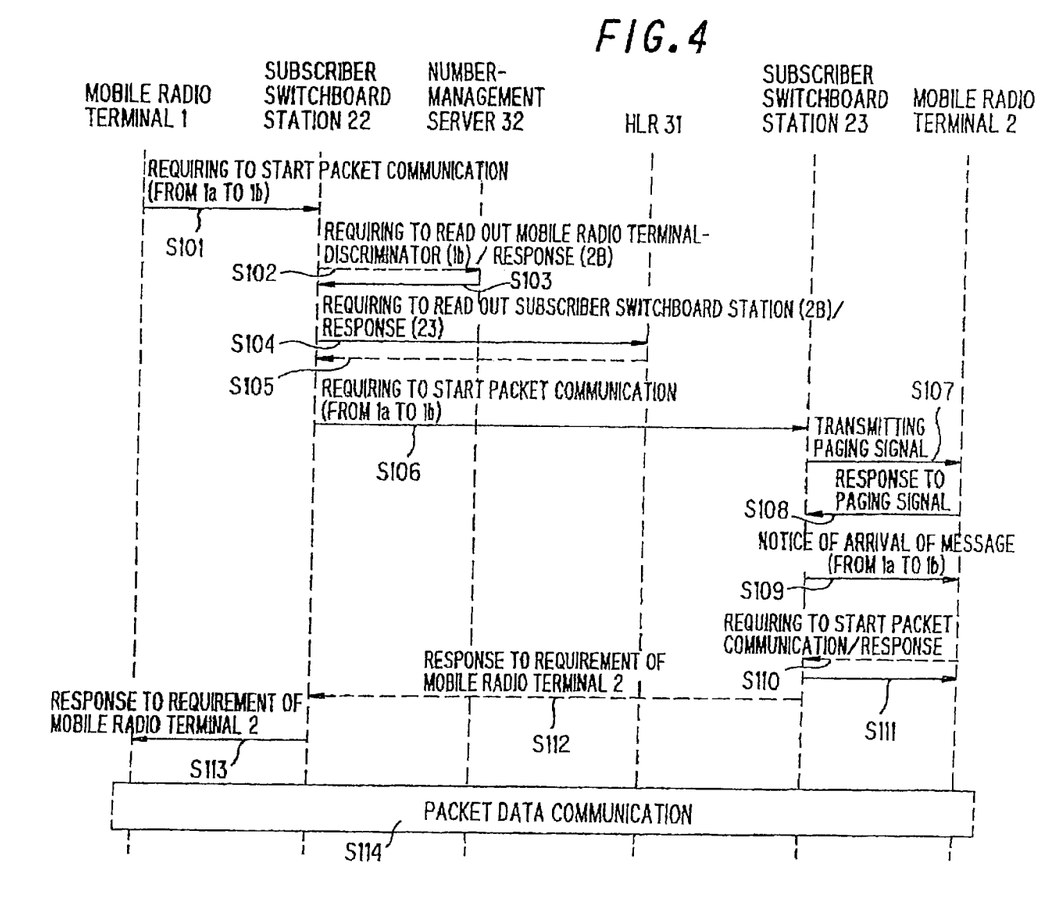
FIG. 4 is a timing chart showing a procedure for establishing a communication route of a packet data in a GPRS shown in FIG. 3.
Figure 5:
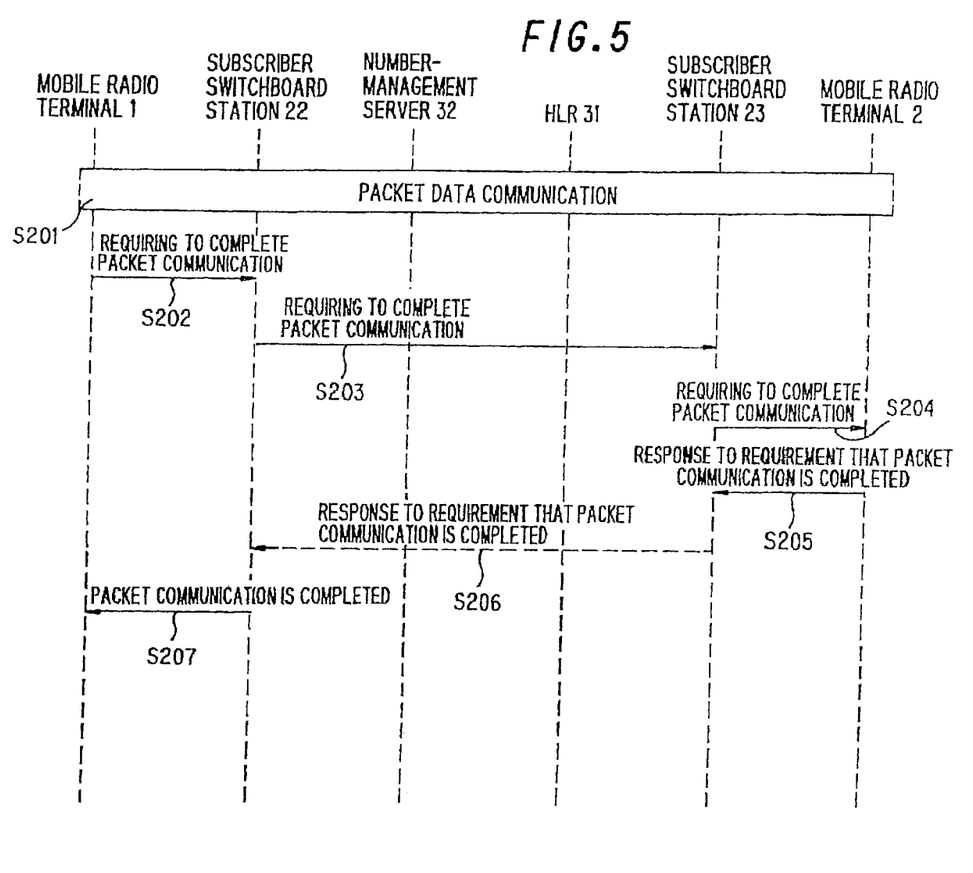
FIG. 5 is a timing chart showing a procedure for completing a packet data communication in a GPRS shown in FIG. 3.

FIG. 4 shows a procedure for transmitting the packet data 50 from the mobile radio terminal 1 to the mobile radio terminal 2 in the system shown in FIG. 3, that is to say, a procedure for establishing a route for the packet data communication between the mobile radio terminals 1, 2. Moreover, FIG. 5 shows a procedure for completing the packet data communication in the system shown in FIG. 3, after the packet data 50 is transmitted to the mobile radio terminal 2. In the above descriptions, it is assumed that the mobile radio terminus 1, 2 respectively exist in the different location areas 11, 12 of the subscriber switchboard stations 22, 23. In FIGS. 4, 5, "S" means the step.

The operation of the first preferred embodiment will be explained referring to FIGS. 3 to 5.

First, the mobile radio terminal 1 requires the subscriber switchboard station 22 to start the packet data communication directed to the mobile radio terminal 2, where the requirement presented from the mobile terminal 1 includes a transmitting user's address 1a and a receiving user's address 1b (S101). When the subscriber switchboard station 22 receives the requirement presented from the mobile radio terminal 1, the subscriber switchboard station 22 requires the number-management server 32 to read out the mobile terminal-discriminator corresponding to the receiving user's address 1b, where the requirement presented from the subscriber board station 22 includes the receiving user's address 1b (S102) When the number-management server 32 receives the requirement presented from the subscriber switchboard station 22, the number-management server 32 reads out the mobile radio-discriminator 2B corresponding to the receiving user's address 1b from TABLE A, sets the mobile radio terminal-discriminator 2B in a response to the requirement presented from the subscriber switchboard station 22, and transmits it back to the subscriber switchboard station 22 (S103).

When the subscriber switchboard station 22 receives the response to the requirement presented therefrom, the subscriber switchboard station 22 requires the HLR 31 to clarify a subscriber switchboard station in a location area of which the mobile 2 exists, where the requirement presented from the subscriber switchboard station 22 includes the mobile radio terminal-discriminator 2B (S104) When the HLR 31 receives the requirement presented from the subscriber switchboard station 22, the HLR 31 reads out the subscriber switchboard station 23 corresponding to the mobile radio terminal-discriminator 2B from TABLE B provided for the HLR 31, and transmits it back to the subscriber switchboard station 22 as a response to the requirement presented from the subscriber switchboard station 22 (S105). When the subscriber switchboard station 22 receives the response to the requirement presented therefrom, the subscriber switchboard station 22 requires the subscriber switchboard station 23 to start the packet data communication directed to the mobile radio terminal 2, where the requirement presented from the subscriber switchboard station 22 includes the mobile radio terminal-discriminator 2B, the receiving user's address 1b, and the transmitting user's address 1a (S106) When the subscriber switchboard station 23 receives the requirement presented from the subscriber switchboard station 22 that the packet data communication should be started, the subscriber switchboard station 23 transmits a paging signal to the mobile radio terminal 2 which exists in the location area 12 thereof (S107).

When the mobile radio terminal 2 receives the paging signal transmitted from the subscriber switchboard station 23 and confirms that this signal is addressed itself, the mobile radio terminal 2 transmits a response to the paging signal to the subscriber switchboard station 23 (S108). When the subscriber switchboard station 23 receives the response to the paging signal transmitted from the mobile radio terminal 2, the subscriber switchboard station 23 transmits a notice of arrival of a message to the mobile radio terminal 2, where the notice of arrival of massage includes the receiving user's address 1b and the transmitting user's address 1a (S109). When the mobile radio terminal 2 receives the notice of arrival of the message, the mobile radio terminal 2 requires the subscriber switchboard station 23 to start the packet data communication (S110). When the subscriber switchboard station 23 receives the requirement presented from the mobile radio terminal 2 that the packet data communication should be started, the subscriber switchboard station 23 transmits a response thereto to the mobile radio terminal 2 (S111) Moreover, the subscriber switchboard station 23 transmits the response to the requirement presented from the mobile radio terminal 2 that the packet data communication should be started to the subscriber switchboard station 22 (S112) When the subscriber switchboard station 22 receives the response to the requirement which is presented from the mobile radio terminal 2 and translated from the subscriber switchboard station 23, the subscriber switchboard station 22 transmits the response to the requirement presented from the mobile radio terminal 2 to the mobile radio terminal 1 (S113). Thereafter, the packet data 50 becomes possible to be transmitted and received between the mobile radio terminals 1, 2 (S114).

When transmission and reception of the packet data 50 between the mobile radio terminal 1, 2 are over (S201), the process for completing the packet data communication is carried out as shown in FIG. 5. When transmission and reception of the packet data 50 are over, the mobile radio terminal 1 which desires to complete the packet data communication transmits a requirement that the packet data communication should be complete to the subscriber switchboard station 22 (s202). When the subscriber switchboard station 22 receives the requirement presented from the mobile radio terminal 1, the subscriber switchboard station 22 transmits the requirement that the packet data communication should be completed to the subscriber station 23 (S203). When the subscriber switchboard station 23 receives the requirement presented from the subscriber switchboard station 22, the subscriber switchboard station 23 transmits the requirement that the data packet communication should be completed to the mobile radio terminal 2 (S204). When the mobile radio terminal 2 receives the requirement presented from the subscriber switchboard station 23, the mobile radio terminal 2 transits a response to the requirement that the packet data communication should be completed to the subscriber switchboard station 23 (S205). When the subscriber switchboard station 23 receives the response transmitted from the mobile radio terminal 2, the subscriber switchboard station 23 transmits the response to the requirement that the packet data communication should be completed to the subscriber switchboard station 22 (S206). When the subscriber switchboard station 22 receives the response transmitted from the subscriber switchboard station 23, the subscriber switchboard station 22 transmits a message for notifying that the packet data communication is completed to the mobile radio terminal 1 (S207).

As mentioned in the above, according to the aforementioned embodiment, the packet data 50 can be transmitted and received between the mobile radio terminals 1, 2 which are placed under the command of the same GPRS, without passing through an external network.

[The Second Preferred Embodiment]

Figure 6:
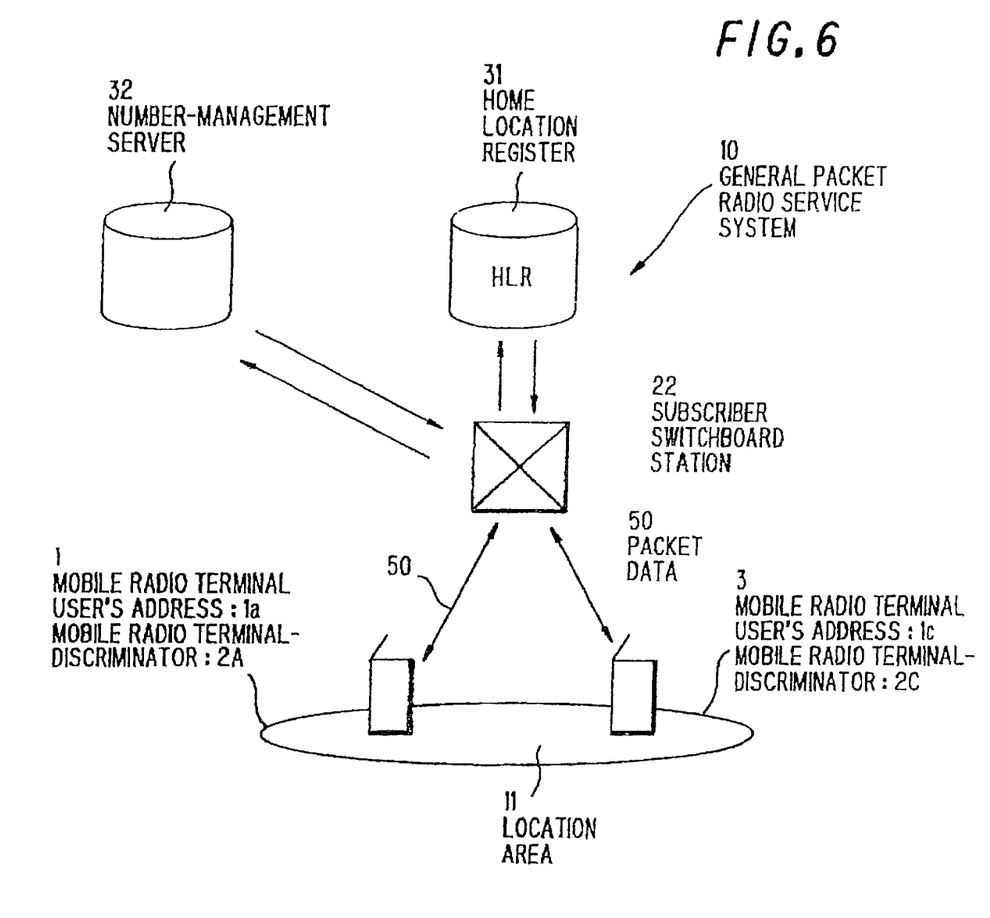
FIG. 6 is a block diagram for showing a GPRS according to the second preferred embodiment of the invention.

FIG. 6 shows the GPRS according to the second preferred embodiment of the invention.

In this embodiment, the plural mobile radio terminals are placed under the command of the same subscriber switchboard station. That is to say, the mobile radio terminals 1, 3 exist in the same location area 11 of the subscriber switchboard station 22, and the packet data 50 is transmitted and received between the mobile radio terminals 1, 3. Except the aforementioned essentials, the structure of the GPRS shown in FIG. 6 is the same as that shown in FIG. 3.

When the mobile radio terminal 1 desires to exchange communication with the mobile radio terminal 3, the mobile radio terminal 1 requires the subscriber switchboard station 22 to start the packet data communication directed to the mobile radio terminal 3, where the requirement presented from the mobile radio terminal 1 includes the transmitting user's address 1a and the receiving user's address 1c. When the subscriber switchboard station 22 receives the requirement presented from the mobile radio terminal 1, the subscriber switchboard station 22 inquires of the number-management server 32 about the mobile radio terminal-discriminator corresponding to the receiving user's address 1c, and acquires the mobile radio terminal-discriminator 2C. Next, the subscriber switchboard station 22 inquires of the HLR 31 about a subscriber switchboard station in a location area of which the mobile radio terminal 3 exists, where the HLR 31 is notified of the mobile radio terminal-discriminator 2C simultaneously with the aforementioned inquiry. When the subscriber switchboard station 22 recognizes that the mobile radio terminal 3 exists in its own location area 11 on the basis of a notice presented from the HLR 31, the subscriber switchboard station 22 transmits a paging signal to the mobile radio terminal 3, and establishes a route for the packet data communication between the mobile radio terminals 1, 3.

As mentioned in the above, it becomes possible to transmit and receive the packet data 50 between the mobile radio terminals 1, 3 placed under the command of the same GPRS, without passing through an external network also in the second preferred embodiment.

Although a signal user's address is assigned to each mobile radio terminal in the aforementioned embodiments, the plural user's addresses may be assigned to the same mobile radio terminal. In such a case, TABLE A in which the plural user's addresses correspond to the common mobile radio terminal-discriminator is held by the number-magnet server 32.

[The Third Preferred Embodiment]

Figure 7:
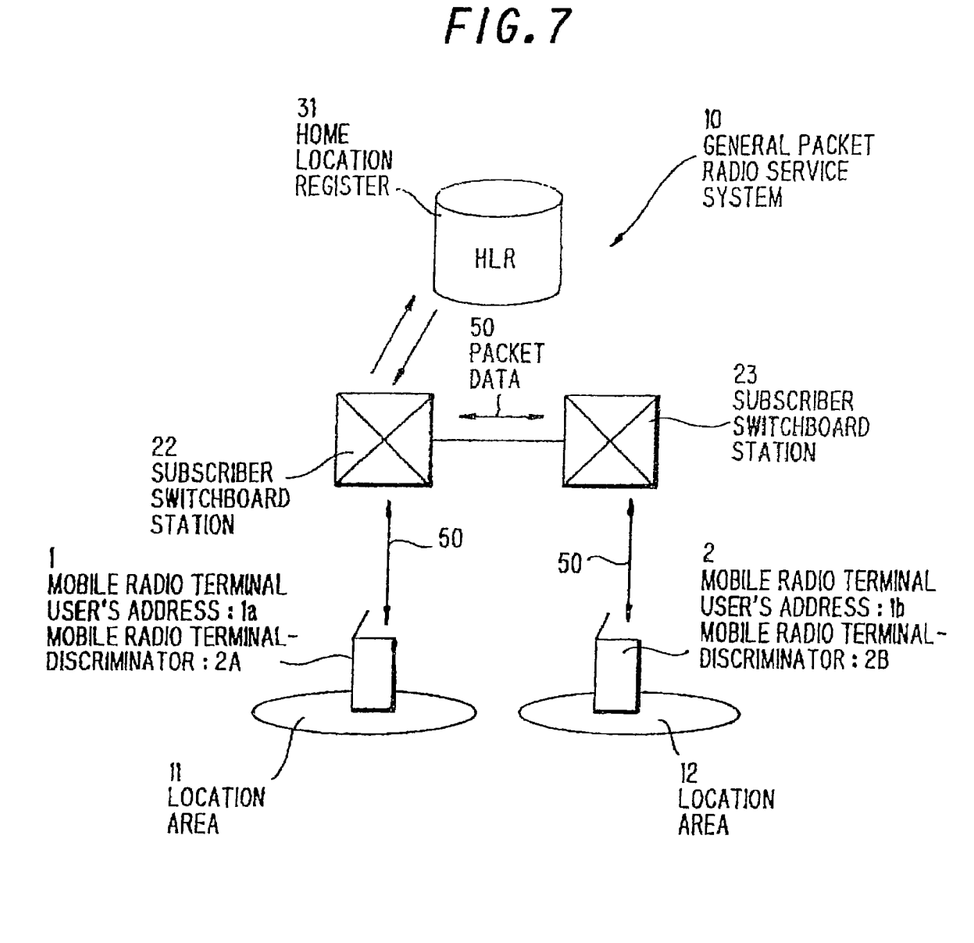
FIG. 7 is a block diagram for showing a GPRS according to the third preferred embodiment of the invention.

FIG. 7 is a block diagram for showing a structure of the third preferred embodiment of the invention.

Although TABLE A for clarifying the correspondence between the user's addresses and the mobile radio terminal-discriminators is provided for the number-management server 32 in the aforementioned embodiments shown in FIGS. 3, 6, TABLE A is provided for the HLR 31 in the third preferred embodiment. That is to say, the HLR 31 fulfills the function of the number-management server in addition to its own essential function in the third preferred embodiment. The operation of the third preferred embodiment shown in FIG. 7 will be explained referring to FIG. 8 for showing a timing chart.

Figure 8:
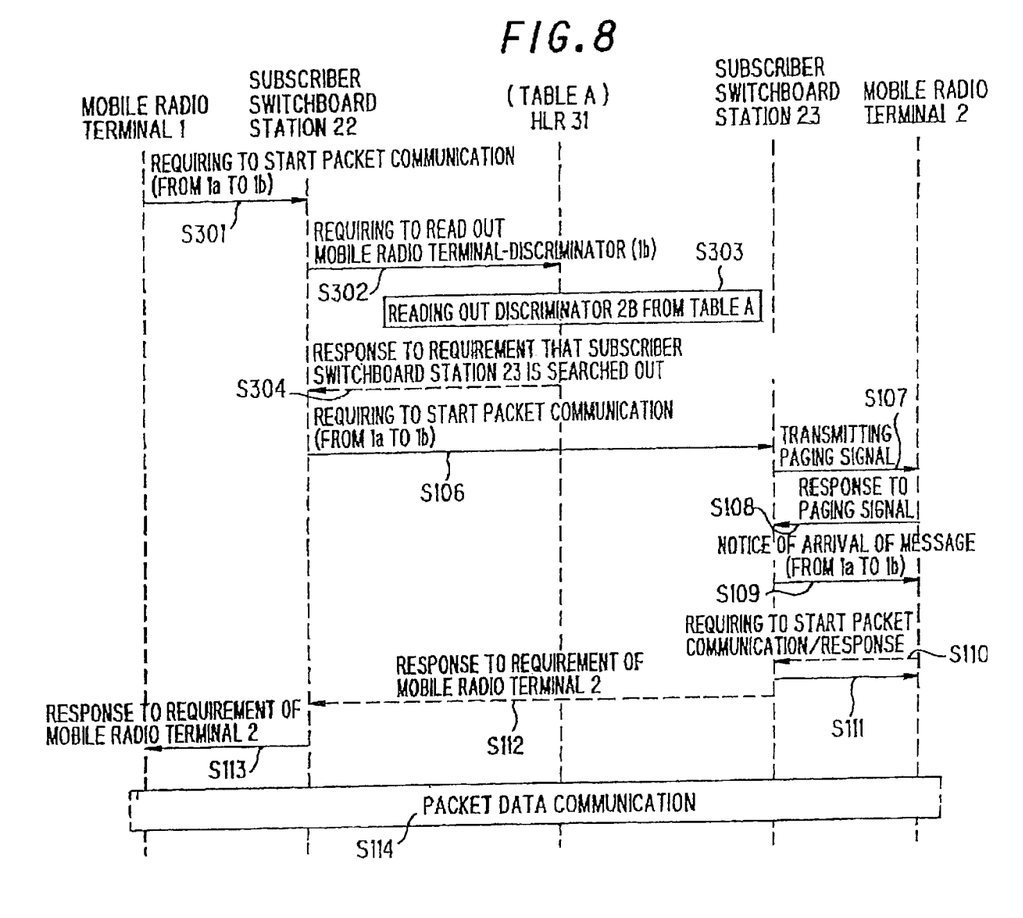
FIG. 8 is a timing chart showing a procedure for establishing a communication route of a packet data in a GPRS shown in FIG. 7.

The mobile radio terminal 1 requires the subscriber switchboard station 22 to start the packet data communication directed to the mobile radio terminal 2, where the requirement presented from the mobile radio terminal 1 includes a transmitting user's address 1a and a receiving user's address 1b (S301). When the subscriber switchboard station 22 receives the requirement presented from the mobile radio terminal 1, the subscriber switchboard station 22 requires the HLR 31 to read out a subscriber switchboard station in a location area of which the mobile radio terminal 2 exists, where the requirement presented to the HLR 31 includes the receiving user's address 1b (S302). When the HLR 31 receives the requirement presented from the subscriber switchboard station 22, the HLR 31 reads out the mobile radio terminal-discriminator 2B corresponding to the receiving user's address 1b, referring to TABLE A provided therefor (S303), subsequently reads out the subscriber switchboard station 23 corresponding to the mobile radio terminal-discriminator 2B from TABLE B provided therefor, and transmits information on the subscriber switchboard station 23 to the subscriber switchboard station 22 (S304). Next, when the subscriber switchboard station 22 receives information on the subscriber switchboard station 23 transmitted from the HLR 31, the subscriber switchboard station 22 requires the subscriber switchboard station 23 to start the packet data communication directed to the mobile radio terminal 2, where the requirement presented from the subscriber switchboard station 22 includes the mobile radio terminal-discriminator 2B, the receiving user's address 1b and the transmitting user's address 1a (S106). Since the operation carried out thereafter in the third preferred embodiment is the same as that shown in FIG. 4, the detained explanation thereon will be omitted. Moreover, since the procedure for completing the packet data communication is the same as that shown in FIG. 5, the detailed explanation thereon will be omitted.

Although not a limitation is imposed on the user's address in the aforementioned embodiments, the IP v 4 address or the IP v 6 address may be assigned to the user, where each user's address is held by each mobile radio terminal. In this case, if a local area network is provided for the GPRS, it becomes possible to assign local addresses to the mobile radio terminals.

The principle of the invention mentioned in the above can be also applied to the packet data communication between the mobile radio terminals respectively placed under the commands of the different GPRSes. In order make it possible to directly interchange the packet data between the mobile radio terminals placed under the command of integrated GPRS which is composed of the plural GPRSes without passing through external network, such as the ISP or the local area network, it is indispensable to uniquely assign the different user's addresses to the respective mobile radio terminals throughout the integrated GPRS. The plural number-management servers may be respectively provided for the plural GPRSes, or the signal number-management server may be used by the plural GPRSes in common.

As mentioned in the above, in the GPRS according to the invention, the number-management server manages the correspondence between the user's addresses and the mobile radio terminal-discriminators, and reads out the mobile radio terminal-discriminator corresponding to the receiving user's address in accordance with a requirement presented from the first subscriber switchboard station in a location area of which the transmitting mobile radio terminal exists, where the transmitting mobile radio terminal has required the first subscriber switchboard station to start the packet data communication directed to the receiving mobile terminal and notified the first switchboard station of the receiving user's address. Then, the number-management server transmits the mobile radio terminal-discriminator corresponding to the receiving user's address read thereby to the first subscriber switchboard station. Moreover, the HLR connected with the subscriber switchboard stations reads out the second subscriber switchboard station in a location area of which the receiving mobile terminal exists on the basis of the mobile radio terminal-discriminator corresponding to the receiving user's address transmitted from the first subscriber switchboard station, transmits information on the second subscriber switchboard station to the first subscriber switchboard station, and thereby makes it possible to establish a route for the packet data communication between transmitting and receiving mobile radio terminals. Accordingly, it becomes possible to transmit and receive the packet data between the mobile radio terminals in the same GPRS without passing through the external network, so that the packet data is prevented from being lost or delayed.

Moreover, in the other GPRS according to the invention, since the HLR is provided with the first table for clarifying the correspondence between the user's addresses and the mobile radio terminal-discriminators, and the second table for clarifying the correspondence between the mobile radio terminal-discriminators and the subscriber switchboard stations in location areas of which the mobile radio terminals corresponding to the mobile radio terminal-discriminators exist, reads out the mobile radio terminal-discriminator corresponding to the receiving user's address from the first table, the receiving user's address being transmitted from the first subscriber switchboard station in a location area of which the transmitting mobile radio terminal exists, searches out the second subscriber switchboard station in a location area of which the receiving mobile radio terminal exists from the second table referring to the mobile radio terminal-discriminator corresponding to the receiving user's address, transmits information on the second subscriber switchboard station to the first subscriber switchboard station, and thereby enables the first subscriber switchboard station to start the packet data communication directed to the receiving subscriber switchboard station; it becomes possible to transmit and receive the packet data between the mobile radio terminals in the same GPRS without passing through the external network, so that the packet data is prevented from being lost or delayed.

What is claimed is:

1. A general packet radio service system (GPRS, hereinafter), in which one or more subscriber switchboard stations are founded, plural mobile radio terminals are connected with said one or more subscriber switchboard stations by radio, and a packet data is transmitted and received between said transmitting and receiving mobile radio terminals via said one or more subscriber switchboard stations, comprising:

a number-management server, which is connected with said one or more subscriber switchboard stations, manages a correspondence between user's addresses respectively assigned to said plural mobile radio terminals and mobile radio terminals-discriminators respectively corresponding to said user's addresses, and reads out said mobile radio terminal-discriminator corresponding to said receiving user's address in accordance a requirement presented from said first subscriber switchboard station in a location area of which said transmitting mobile radio terminal exists, wherein said transmitting mobile radio terminal has required said first subscriber switchboard station to start a packet data communication directed to said receiving mobile radio terminal, and notified said first subscriber switchboard station of said receiving user's address, and transmits said mobile radio terminal-discriminator corresponding to said receiving user's address to said first subscriber switchboard station, and a home location register (HLR, hereinafter) which is connected with said one or more subscriber switchboard stations, reads out said second subscriber switchboard station in a location area of which said receiving mobile radio terminal exists on a basis of said mobile radio terminal-discriminator corresponding to said receiving user's address transmitted from said first subscriber switchboard station, transmits information on said second subscriber switchboard station to said first subscriber switchboard station, and thereby enables said first subscriber switchboard station to start a packet data communication directed to said receiving mobile radio terminal via said second subscriber switchboard station.

2. The GPRS as defined in claim 1, wherein:

both said transmitting and receiving mobile terminals exist in a location area of said first subscriber switchboard station, and said second subscriber switchboard station coincides with said first subscriber switchboard station.

3. The GPRS as defined in claim 1, wherein:

said number-management server is provided with a first table for clarifying a correspondence between user's addresses and said mobile radio terminal-discriminators, and said HLR is provided with a second table for clarifying a correspondence between said mobile radio terminal-discriminators and said subscriber switchboard stations in location areas of which said mobile radio terminals corresponding to said mobile radio terminal-discriminators exist.

4. The GPRS as defined in claim 1, wherein:

said user's address is an IP v 4 address or an IP v 6 address.

5. The GPRS as defined in claim 1, wherein:

said GPRS includes an integrated GPRS composed of said plural GPRSes, and said user's addresses are uniquely assigned to said respective mobile radio terminals throughout said integrated GPRS.

6. A GPRS, in which one or more subscriber switchboard stations are founded, plural mobile radio terminals are connected with said one or more subscriber switchboard stations by radio, and a packet data is transmitted and received between said transmitting and receiving mobile radio terminals via said one or more subscriber switchboard stations, comprising:

a HLR, which is provided which a table for clarifying a correspondence between user's addresses respectively assigned to said plural mobile radio terminals and mobile radio terminal-discriminators respectively corresponding to said user's addresses, connected with said one or more subscriber switchboard stations, reads out said mobile radio terminal-discriminator corresponding to said receiving user's address from said table, said receiving user's address being transmitted to said HLR from said first subscriber switchboard station in a location area of which said transmitting mobile radio terminal exists just after said transmitting mobile radio terminal requires said first subscriber switchboard station to start said packet data communication directed to said receiving mobile radio terminal, judges said second subscriber switchboard station in a location area of which said receiving mobile radio terminal exists on a basis of said mobile radio terminal-discriminator corresponding to said receiving user's address, transmits information on said second subscriber switchboard station to said first subscriber switchboard station, and thereby enables said first subscriber switch board station to start a packet data communication directed to said receiving mobile radio terminal via said second subscriber switchboard station.

7. The GPRS as defined in claim 6, wherein:

both said transmitting and receiving mobile radio terminals exist in a location area of said first subscriber switchboard station, and said second subscriber switchboard station coincides with said first subscriber switchboard station.

8. The GPRS as defined in claim 6, wherein:

said user's address is an IP v 4 address or an IP v 6 address.

9. The GPRS as defined in claim 6, wherein:

said GPRS includes an integrated GPRS composed of said plural GPRSes, and said user's addresses are uniquely assigned to said respective mobile radio terminals throughout said integrated GPRS.

10. A method for controlling a GPRS, in which one or more subscriber switchboard stations are founded, plural mobile radio terminals are connected with said one or more subscriber switchboard stations by radio, and a packet data is transmitted and received between said transmitting and receiving mobile radio terminals via said one or more subscriber switchboard stations, comprising the steps of:

managing a correspondence between user's addresses respectively assigned to said plural mobile radio terminals and mobile radio terminal-discriminators respectively assigned to said user's addresses in a first table provided for a number-management server, clarifying a correspondence between said mobile radio terminal-discriminators and said subscriber switchboard stations in location areas of which said mobile radio terminals corresponding to said mobile radio terminal-discriminators respectively exist in a second table provided for a HLR, transmitting a requirement presented from said transmitting mobile radio terminal that said first subscriber switchboard station in a location area of which said transmitting mobile radio terminal exists should start a packet data communication directed to said receiving mobile radio terminal to said first subscriber switchboard station, said requirement presented from said transmitting mobile radio terminal including said transmitting and receiving user's addresses, transmitting a requirement presented from said first subscriber switchboard station that said number-management server should read out said mobile radio terminal-discriminator corresponding to said receiving user's address to said number-management server, said requirement presented from said first subscriber switchboard station including said receiving user's address, reading out said mobile radio terminal-discriminator corresponding to said receiving user's address from said first table provided for said number-management server, transmitting said mobile radio terminal-discriminator corresponding to said receiving user's address to said first subscriber switchboard station from said number-management server, transmitting a requirement presented from said first subscriber switchboard station that said HLR should read out said second subscriber switchboard station in a location area of which said receiving mobile radio terminal exists, said requirement presented from said first subscriber switchboard station including said mobile radio terminal-discriminator corresponding to said receiving user's address, reading out said second subscriber switchboard station from said second table provided for said HLR, referring to said mobile radio terminal-discriminator corresponding to said receiving user's address which is transmitted from said first subscriber switchboard station, transmitting information on said second subscriber switchboard station to said first subscriber switchboard station from said HLR, transmitting a requirement presented from said first subscriber switchboard station that said second subscriber switchboard station should start said packet data communication directed to said receiving mobile radio terminal, said requirement presented from first subscriber switchboard station including said mobile radio terminal discriminator corresponding to said receiving user's address and said transmitting and receiving user's addresses, and establishing a route for said packet data communication between said transmitting and receiving mobile radio terminals.

11. A method for controlling a GPRS, in which one or more subscriber switchboard stations are founded, plural mobile radio terminals are connected with said one or more subscriber switchboard stations by radio, and a packet data is transmitted and received between said transmitting and receiving mobile radio terminals via said one or more subscriber switchboard stations, comprising the steps of:

managing a correspondence between user's addresses respectively assigned to said plural mobile radio terminals and mobile radio terminal-discriminators respectively assigned to said user's addresses in a first table provided for a HLR, clarifying a correspondence between said mobile radio terminal-discriminators and said subscriber switchboard stations in location areas of which said mobile radio terminals corresponding to said mobile radio terminal-discriminators respectively exist in a second table provided for a HLR, transmitting a requirement presented from said transmitting mobile radio terminal that said first subscriber switchboard station in a location area of which said transmitting mobile radio terminal exists should start a packet data communication directed to said receiving mobile radio terminal to said first subscriber switchboard station, said requirement presented from said transmitting mobile radio terminal including said transmitting and receiving user's addresses, transmitting a requirement presented from said first subscriber switchboard station that said HLR should read out said mobile radio terminal-discriminator corresponding to said receiving user's address to said HLR, said requirement presented from said first subscriber switchboard station including said receiving user's address, reading out said mobile radio terminal-discriminator corresponding to said receiving user's address from said first table provided for said HLR, reading out said second subscriber switchboard station in a location area of which said receiving mobile radio terminal exists from said second table provided for said HLR, referring to said mobile radio terminal-discriminator corresponding to said receiving user's address which is clarified in said above step, transmitting information on said second subscriber switchboard station to said first subscriber switchboard station from said HLR, transmitting a requirement present from said first subscriber switchboard station that said second subscriber switchboard station should start said packet data communication directed to said receiving mobile radio terminal, said requirement resented from said first subscriber switchboard station including said mobile radio terminal-discriminator corresponding to said receiving user's address and said transmitting and receiving user's addresses, and establishing a route for said packet data communication between said transmitting and receiving mobile radio terminals.

* * * * *